(12) United States Patent
Heo et al.

(10) Patent No.: US 12,345,266 B2
(45) Date of Patent: Jul. 1, 2025

(54) ELECTRIC WATER PUMP

(71) Applicants: HYUNDAI MOTOR COMPANY, Seoul (KR); KIA CORPORATION, Seoul (KR)

(72) Inventors: Tae Gwan Heo, Gwacheon-si (KR); Gun Goo Lee, Suwon-si (KR); Shin Gyu Kim, Hwaseong-si (KR); Byung Soo Kim, Pyeongtaek-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 74 days.

(21) Appl. No.: 17/968,350

(22) Filed: Oct. 18, 2022

(65) Prior Publication Data

US 2023/0179055 A1 Jun. 8, 2023

(30) Foreign Application Priority Data

Dec. 8, 2021 (KR) .......................... 10-2021-0174544

(51) Int. Cl.
| | |
|---|---|
| *F04D 13/06* | (2006.01) |
| *H02K 3/44* | (2006.01) |
| *H02K 3/52* | (2006.01) |
| *H02K 21/24* | (2006.01) |

(52) U.S. Cl.
CPC ..... *F04D 13/0626* (2013.01); *F04D 13/0666* (2013.01); *H02K 3/522* (2013.01); *H02K 21/24* (2013.01); *H02K 3/44* (2013.01); *H02K 2203/12* (2013.01)

(58) Field of Classification Search
CPC .. F04D 13/0626; F04D 13/0666; F04D 13/06; H02K 21/24; H02K 3/44; H02K 3/522; H02K 5/1282; H02K 2203/12
USPC ...................................................... 417/423.11
See application file for complete search history.

(56) References Cited

U.S. PATENT DOCUMENTS

| | | | | |
|---|---|---|---|---|
| 2,730,953 A | * | 1/1956 | Pensabene .......... | F04D 13/0646 417/357 |
| 2,752,857 A | * | 7/1956 | White ................ | F04D 13/0666 310/104 |
| 2,782,721 A | * | 2/1957 | White ................ | F04D 13/0666 417/357 |
| 3,171,356 A | * | 3/1965 | Pensabene .......... | F04D 13/0666 417/357 |
| 3,279,765 A | * | 10/1966 | Sato .................... | F04D 13/0666 366/273 |
| 3,385,224 A | * | 5/1968 | Jaun .................... | F24D 3/02 415/128 |

(Continued)

FOREIGN PATENT DOCUMENTS

| | | | | |
|---|---|---|---|---|
| CN | 105332927 A | * | 2/2016 | ......... F04D 13/0606 |
| DE | 4438132 A1 | * | 5/1996 | ......... F04D 13/0626 |

(Continued)

*Primary Examiner* — Alexander B Comley
(74) *Attorney, Agent, or Firm* — Lempia Summerfield Katz LLC

(57) ABSTRACT

An electric water pump is configured to reduce an axial distance between a stator and a rotor. Since a separator of a stator casing is formed so as not to cover an upper surface of a stator, the axial thickness of the separator is reduced and the axial distance between the stator and the rotor is also reduced. The reduction in the axial distance allows a motor to have increased output and efficiency.

6 Claims, 7 Drawing Sheets

(56) References Cited

U.S. PATENT DOCUMENTS

| | | | | |
|---|---|---|---|---|
| 3,513,942 | A * | 5/1970 | Sato | F04D 13/0666 |
| | | | | 415/206 |
| 3,767,330 | A * | 10/1973 | Signorile | F04D 13/0666 |
| | | | | 417/420 |
| 4,311,937 | A * | 1/1982 | Clark | F04D 13/0666 |
| | | | | 310/90 |
| 4,806,080 | A * | 2/1989 | Mizobuchi | F16C 33/043 |
| | | | | 384/123 |
| 5,332,374 | A * | 7/1994 | Kricker | F04D 13/027 |
| | | | | 417/420 |
| 5,951,267 | A * | 9/1999 | Piercey | H02K 5/1282 |
| | | | | 417/423.7 |
| 6,012,909 | A * | 1/2000 | Sloteman | F04D 29/5806 |
| | | | | 417/370 |
| 6,034,465 | A * | 3/2000 | McKee | F04D 13/0666 |
| | | | | 417/406 |
| 6,095,770 | A * | 8/2000 | Obata | F04D 13/027 |
| | | | | 417/365 |
| 6,132,186 | A * | 10/2000 | Cooper | H02K 21/24 |
| | | | | 310/44 |
| 6,280,157 | B1 * | 8/2001 | Cooper | F04D 5/006 |
| | | | | 417/423.7 |
| 6,835,051 | B2 * | 12/2004 | Heim | F04D 13/0666 |
| | | | | 417/357 |
| 8,917,007 | B2 * | 12/2014 | Matsuzaki | F04D 13/064 |
| | | | | 310/268 |
| 9,616,157 | B2 * | 4/2017 | Akdis | F04D 29/0473 |
| 9,850,906 | B2 * | 12/2017 | Ozaki | H02K 7/14 |
| 10,584,739 | B2 * | 3/2020 | Turner | F04D 29/0473 |
| 10,995,765 | B2 * | 5/2021 | Sato | F04D 13/0666 |
| 2003/0161745 | A1 * | 8/2003 | Kern | F04D 13/0666 |
| | | | | 417/423.12 |
| 2005/0084398 | A1 * | 4/2005 | Wampler | F04D 13/06 |
| | | | | 417/423.7 |
| 2005/0147512 | A1 * | 7/2005 | Chen | F04D 29/048 |
| | | | | 417/423.1 |
| 2014/0064987 | A1 * | 3/2014 | Cox, Jr. | H02K 11/33 |
| | | | | 417/420 |
| 2016/0131141 | A1 * | 5/2016 | Sato | F04D 29/048 |
| | | | | 417/420 |
| 2016/0341202 | A1 * | 11/2016 | Chai | F04D 13/0606 |
| 2017/0016449 | A1 * | 1/2017 | Gieras | H02K 7/14 |
| 2018/0216620 | A1 * | 8/2018 | Turner | H02K 5/12 |
| 2019/0257319 | A1 * | 8/2019 | Kuronuma | F04D 29/5866 |
| 2020/0173339 | A1 * | 6/2020 | Russalian | F04D 29/5806 |

FOREIGN PATENT DOCUMENTS

| | | | | |
|---|---|---|---|---|
| DE | 19646617 | A1 * | 5/1998 | F04D 13/0666 |
| EP | 105687 | A * | 4/1984 | F04D 13/0666 |
| EP | 1480317 | A2 * | 11/2004 | H02K 1/145 |
| EP | 2273655 | A1 * | 1/2011 | H02K 1/223 |
| FR | 2809777 | A1 * | 12/2001 | F04D 13/026 |
| GB | 808533 | A * | 2/1959 | |
| GB | 1040953 | A * | 9/1966 | |
| GB | 1208661 | A * | 10/1970 | |
| GB | 1323203 | A * | 7/1973 | |
| GB | 2332243 | A * | 6/1999 | F04D 13/0626 |
| JP | H0949496 | A * | 2/1997 | |
| JP | H09144684 | A * | 6/1997 | |
| JP | 2006046212 | A * | 2/2006 | |
| JP | 2007166693 | A * | 6/2007 | F02M 37/048 |
| JP | WO2009157408 | A1 * | 12/2011 | |
| JP | 2013155649 | A * | 8/2013 | F04D 13/064 |
| KR | 102191404 | B1 * | 12/2020 | |
| WO | WO-2006106081 | A1 * | 10/2006 | F04D 13/0626 |
| WO | WO-2021142177 | A1 * | 7/2021 | B22F 5/10 |

* cited by examiner

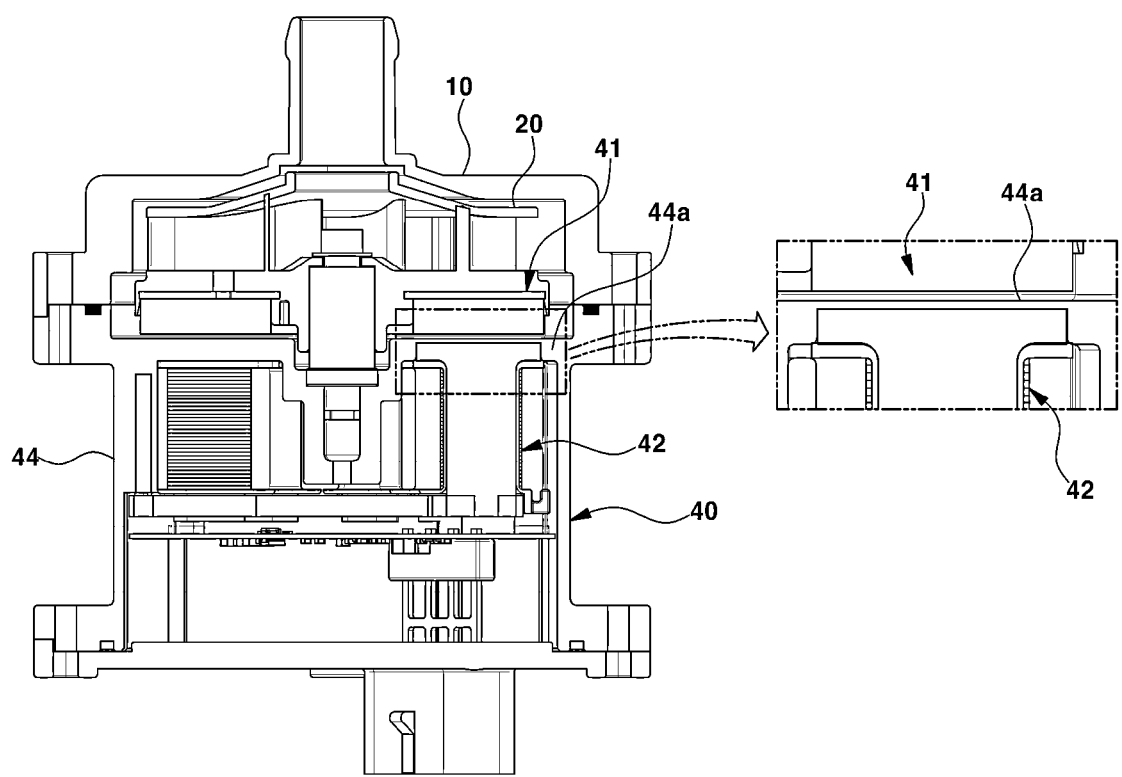
Fig. 6 – Prior Art

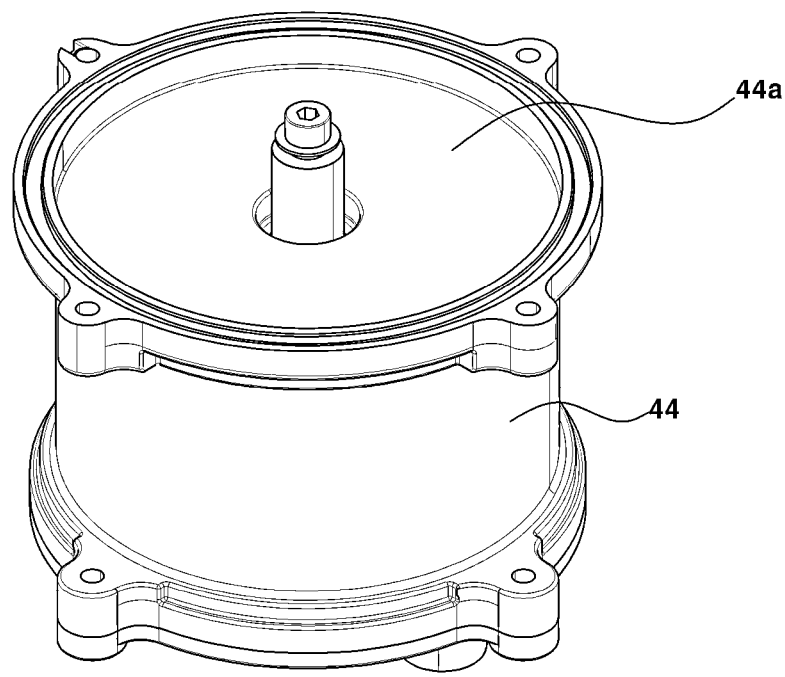
Fig. 7 – Prior Art

ELECTRIC WATER PUMP

CROSS-REFERENCE TO RELATED APPLICATION

This application claims, under 35 U.S.C. § 119(a), the benefit of priority to Korean Patent Application No. 10-2021-0174544 filed on Dec. 8, 2021, the entire contents of which are incorporated herein by reference.

BACKGROUND

(a) Technical Field

The present disclosure relates to an electric water pump. More particularly, it relates to an electric water pump capable of improving the efficiency and output of a pump motor.

(b) Background Art

In recent years, with the increase in environment-friendly vehicles such as electric vehicles and hybrid vehicles, the mechanical parts thereof are being replaced with electric parts. For example, in the case of water pumps, an electric water pump driven by a motor is increasingly used instead of a mechanical water pump driven by engine output.

The mechanical water pump is also referred to as a belt-type water pump since it is connected by a belt to a crankshaft pulley of an engine so as to be driven by the rotational force of the crankshaft thereof.

FIGS. 6 and 7 illustrate a conventional electric water pump of the related art.

As illustrated in FIG. 6, the conventional electric water pump includes an impeller 20 rotatably disposed inside a pump cover 10 and a motor 40 to rotate the impeller 20. The impeller 20 is rotated by the motor 40 to pump a fluid.

The motor 40 includes a rotor 41 coupled to the lower portion of the impeller 20 and a stator 42 to rotate the rotor 41 when a current is applied thereto.

A separator 44a of a casing 44 is disposed between the stator 42 and the rotor 41. The separator 44a serves to isolate the stator 42 from the fluid.

The separator 44a is mainly made of plastic and formed by injection molding to have a minimum thickness in consideration of its strength and function.

However, as illustrated in FIGS. 6 and 7, since the motor 40 is configured such that the separator 44a completely covers the upper surface of the stator 42, the distance between the rotor 41 and the stator 42 is increased by the axial thickness of the separator 44a.

The output and efficiency of the motor 40 decrease as the distance between the rotor 41 and the stator 42 increases.

The above information disclosed in this Background section is only to enhance understanding of the background of the disclosure. Therefore the Background section may contain information that does not form the prior art that is already known in this country to a person of ordinary skill in the art.

SUMMARY

The present disclosure has been made in an effort to solve the above-described problems associated with the prior art. It is an object of the present disclosure to provide an electric water pump in which an axial distance between a stator and a rotor is reduced.

In an aspect, the present disclosure provides an electric water pump configured to reduce an axial distance between a stator and a rotor.

The present disclosure is not limited to the above-mentioned object. Other objects of the present disclosure should be clearly understood by those having ordinary skill in the art to which the present disclosure pertains from the following description.

In an embodiment, there is provided an electric water pump that includes a pump cover having an inlet for inflow of a fluid and an outlet for outflow of the fluid. The electric water pump also includes an impeller disposed in an internal space of the pump cover and rotated by a motor to transfer the fluid, introduced through the inlet, to the outlet.

The motor includes a rotor coupled to the impeller to rotate with the impeller, a stator disposed beneath the rotor and configured to rotate the rotor by generating a magnetic field using an externally applied current, and a casing configured to receive and protect the stator and provided with a separator to isolate an electrical component of the stator from the fluid.

The separator is formed integrally with an upper portion of the stator so as to airtightly surround the upper portion of the stator, without covering an upper surface of the stator.

The stator may include a plurality of stator cores, each including a core head and a core body formed integrally on a lower surface of the core head, and magnetized by the magnetic field. The stator may further include a plurality of bobbins, each disposed on an outer peripheral surface of the associated core body and having a coil wound therearound. The current may be applied to the coil from the outside.

The separator may be formed integrally with the core head so as to airtightly surround the core head, without covering an upper surface of the core head.

The upper surface of the core head may be flush with an upper surface of the separator.

The separator may have a plurality of insert holes arranged in an arrangement direction of the stator cores. Each of the insert holes may be airtightly closed by the associated core head to block the inflow of the fluid.

The upper surface of the core head may come into direct contact with the fluid through the insert hole.

The core head may have a stepped part formed on an edge thereof, and the separator may be formed to surround the stepped part as well.

The bobbins may be formed integrally on a lower surface of the separator.

Other aspects and embodiments of the disclosure are discussed below.

It is understood that the terms "vehicle" or "vehicular" or other similar terms as used herein are inclusive of motor vehicles in general. Such motor vehicles may encompass passenger automobiles including sport utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example vehicles that are both gasoline-powered and electric-powered.

The above and other features of the disclosure are discussed hereinbelow.

BRIEF DESCRIPTION OF THE DRAWINGS

The above and other features of the present disclosure are described in detail with reference to certain embodiments thereof illustrated in the accompanying drawings, which are given hereinbelow by way of illustration only. Thus, such features are not limited to the accompanying drawings and the described embodiments of the present disclosure, wherein:

FIG. 6 is a cross-sectional view illustrating a conventional electric water pump; and FIG. 7 is a view illustrating a motor of the conventional electric water pump when viewed from the outside.

Figure 1:
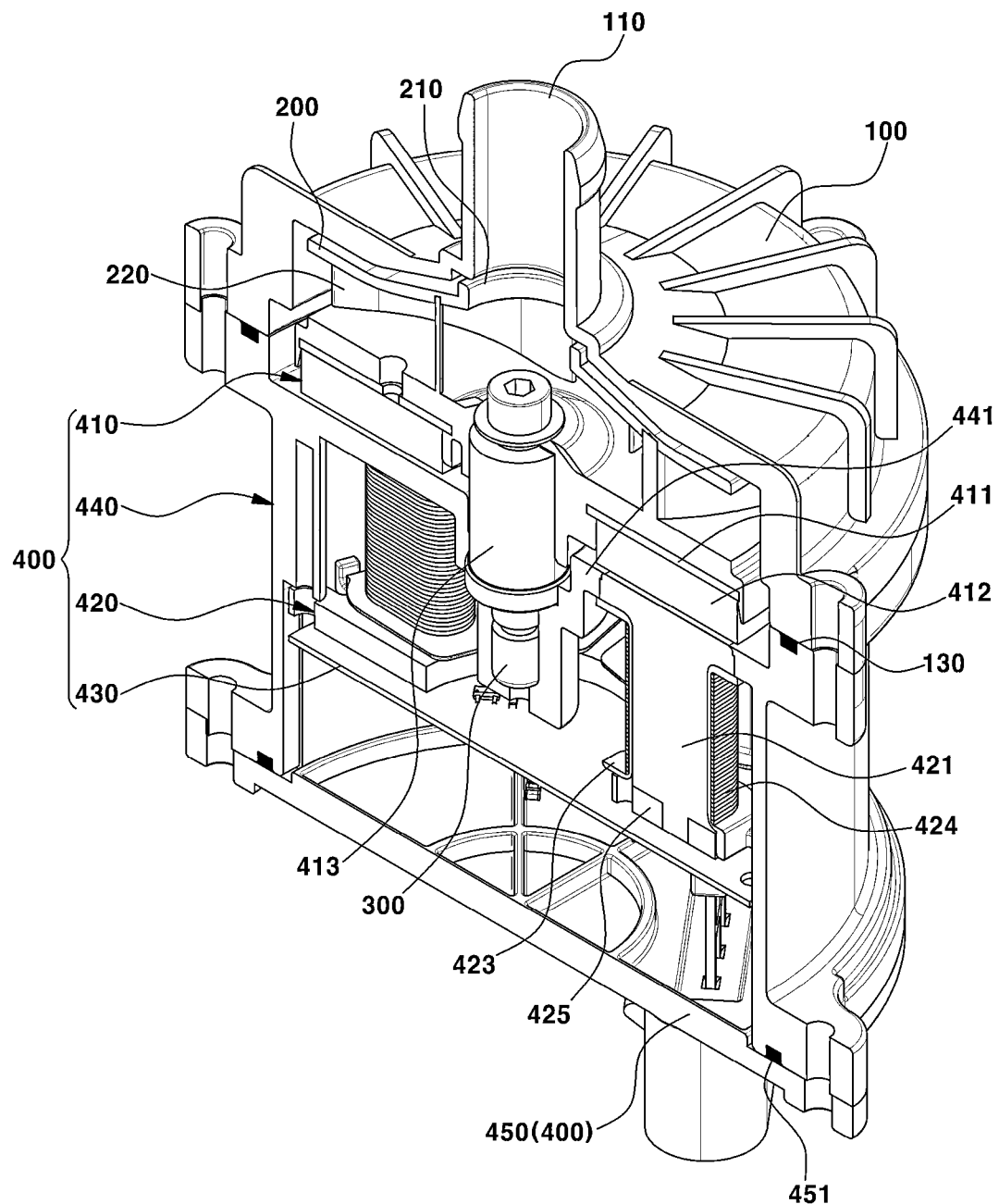
FIG. 1 is an assembled cutaway view illustrating an electric water pump according to an embodiment of the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of the present disclosure throughout the several figures of the drawing.

DETAILED DESCRIPTION

The specific structural or functional descriptions set forth herein are only provided for the purpose of describing the embodiments according to the inventive concept of the present disclosure, and these embodiments may be implemented in different forms. The present disclosure should not be construed as being limited to the embodiments set forth herein, and thus it should be understood that the present disclosure includes all modifications, equivalents, or replacements that fall within the spirit and scope of the disclosure as defined in the following claims.

In addition, it should be understood herein that when a component is referred to as "comprising" or "including" any component, it does not exclude other components, but can further comprise or include the other components unless otherwise specified.

Hereinafter, embodiments of the present disclosure are described with reference to the accompanying drawings. The items represented in the accompanying drawings may be schematically illustrated for easy explanation of the embodiments of the present disclosure, and may be different from those implemented in practice.

Figure 2:
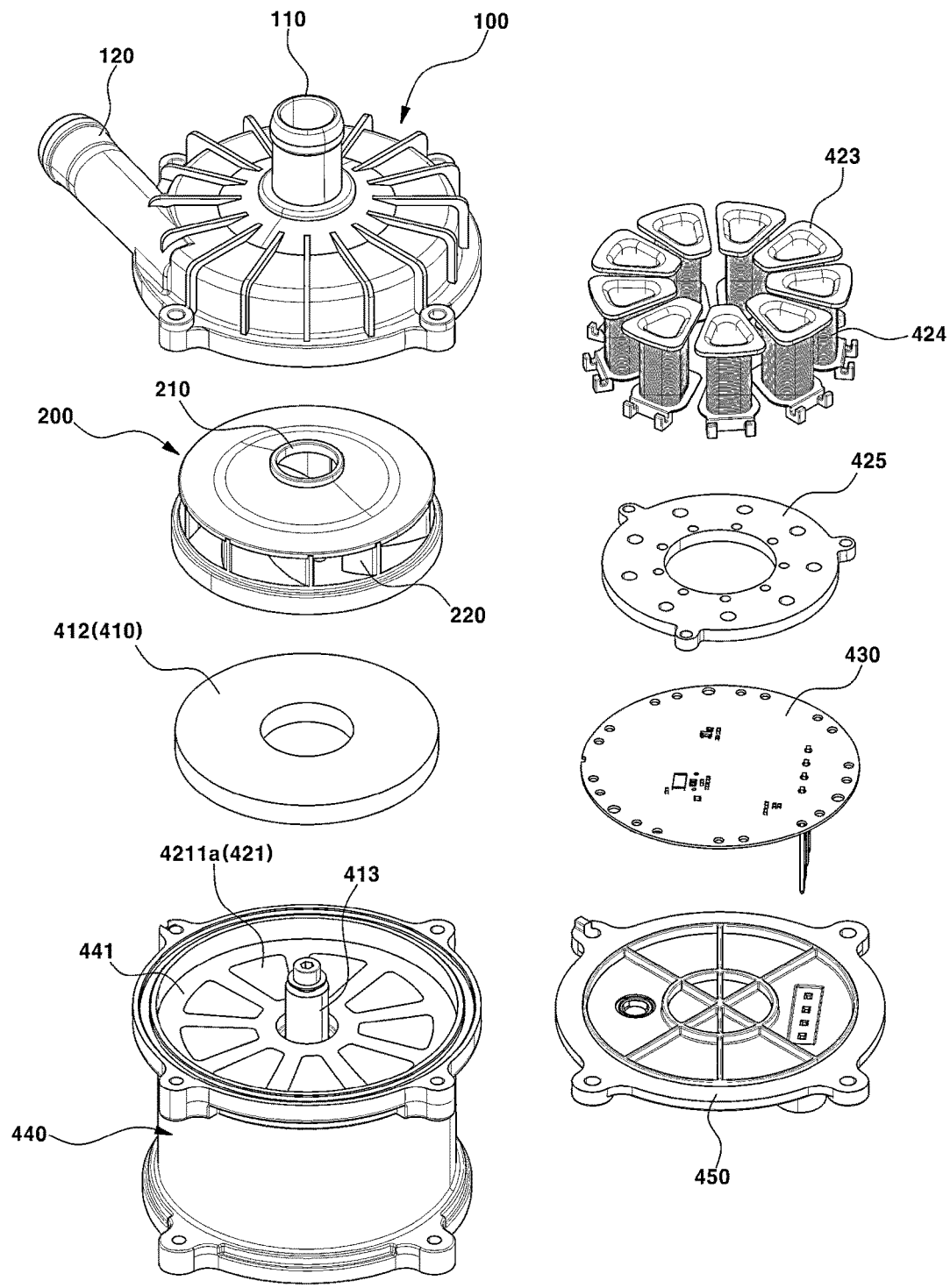
FIG. 2 is an exploded view illustrating the electric water pump according to the embodiment of the present disclosure.
Figure 3:
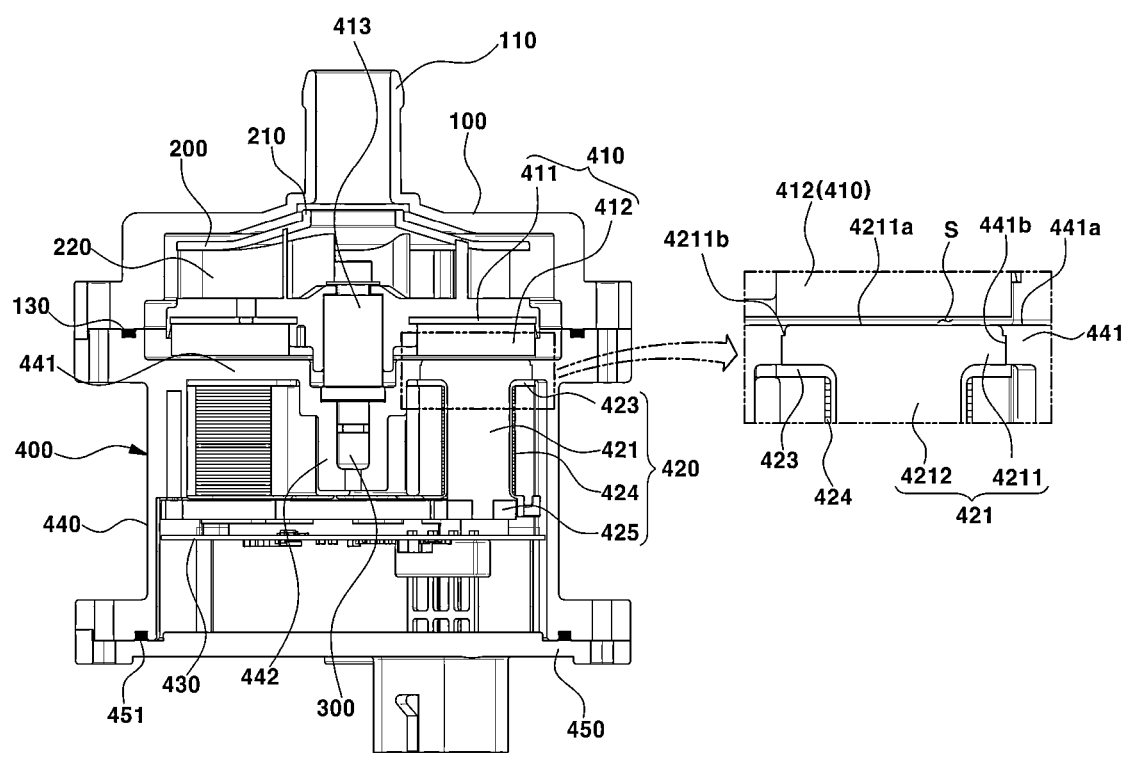
FIG. 3 is a cross-sectional view illustrating the electric water pump according to the embodiment of the present disclosure.
Figure 4:
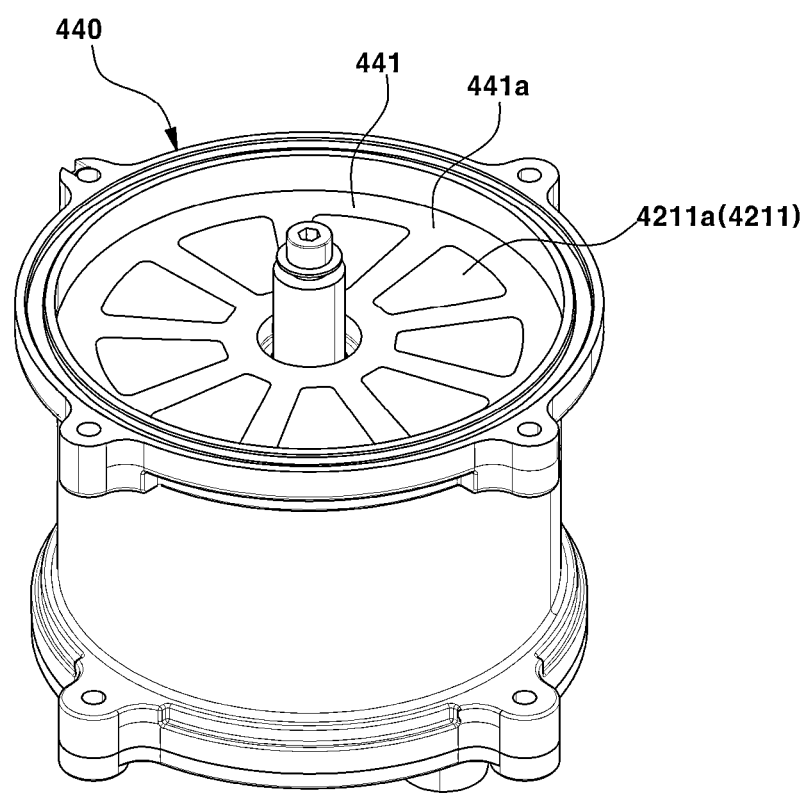
FIG. 4 is a view illustrating a motor of the electric water pump according to the embodiment of the present disclosure when viewed from the outside.
Figure 5:
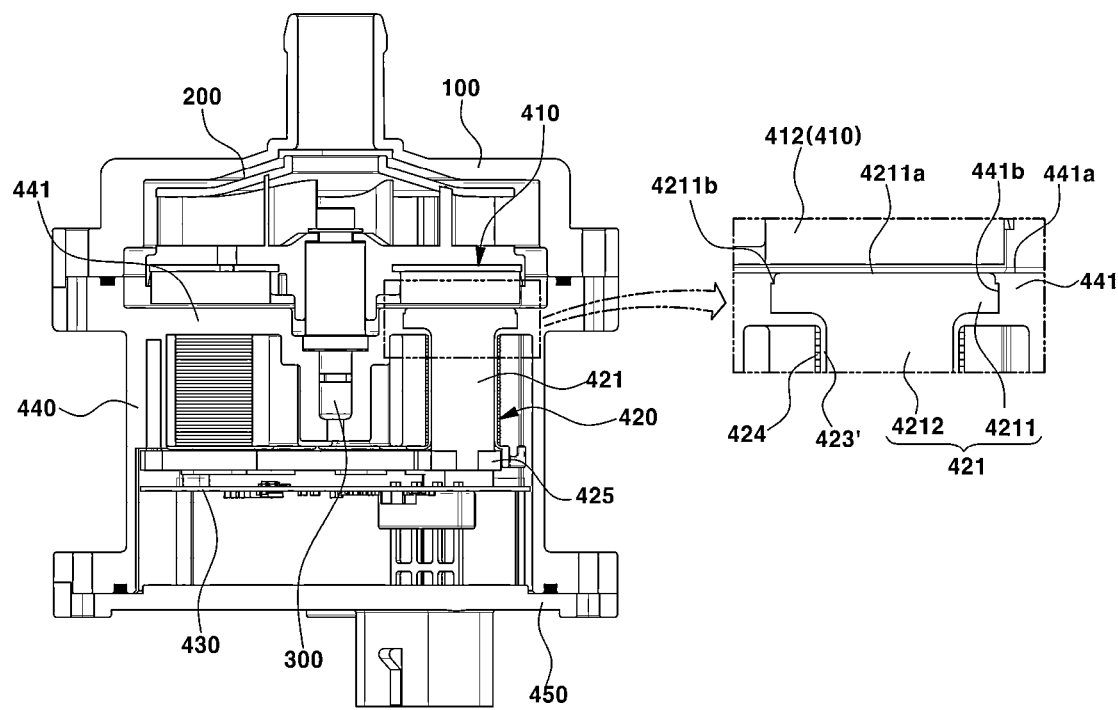
FIG. 5 is a cross-sectional view illustrating an electric water pump according to another embodiment of the present disclosure.

FIG. 1 is an assembled cutaway view illustrating an electric water pump according to an embodiment of the present disclosure. FIG. 2 is an exploded view illustrating the electric water pump. FIG. 3 is a cross-sectional view illustrating the electric water pump. FIG. 4 is a view illustrating a motor of the electric water pump when viewed from the outside. FIG. 5 is a cross-sectional view illustrating an electric water pump according to another embodiment of the present disclosure.

As illustrated in FIGS. 1-3, the electric water pump according to the embodiment of the present disclosure includes a pump cover 100, an impeller 200, and a motor 400.

The pump cover 100 is configured to receive and protect the impeller 200. The pump cover 100 has an internal space defined to receive the impeller 200. The pump cover 100 has an inlet 110 for inflow of a fluid and an outlet 120 for outflow of the fluid. The pump cover 100 is made of a resin-based material.

The inlet 110 is formed integrally on the upper surface of the pump cover 100, and the outlet 120 is formed integrally on the side surface of the pump cover 100. The inlet 110 extends upwards from the upper surface of the pump cover 100, and the outlet 120 extends in the radial direction of the pump cover 100 from the side surface thereof.

The fluid introduced into the internal space of the pump cover 100 through the inlet 110 is discharged out of the pump cover 100 through the outlet 120.

The pump cover 100 is stacked on and fastened to a casing 440 of the motor 400.

The impeller 200 is disposed in the internal space of the pump cover 100. The impeller 200 is rotated by the motor 400 in the internal space of the pump cover 100. The impeller 200 is rotatably coupled to and supported by the upper portion of a shaft 300. The shaft 300 is fixed by its lower portion coupled to the upper portion of the casing 440.

The impeller 200 is rotated by the motor 400 to transfer the fluid introduced through the inlet 110 to the outlet 120. To this end, the impeller 200 has an opening 210 therein and a plurality of vanes 220. The opening 210 is formed in the center of the upper surface of the impeller 200 so as to communicate with the inlet 110. The vanes 220 are arranged in the circumferential direction of the impeller 200. The fluid introduced into the impeller 200 through the opening 210 flows between the vanes 220. The impeller 200 is made of a resin-based material.

The motor 400 includes a rotor 410, a stator 420, a drive controller 430, and the casing 440.

The rotor 410 is coupled to the impeller 200 to rotate together with the impeller 200 about the shaft 300. The rotor 410 is fixedly coupled to the lower surface of the impeller 200. The rotor 410 includes a rotor back yoke 411, a permanent magnet 412, and a rotor bush 413.

The rotor back yoke 411 serves as a passage for magnetic flux and is fixedly coupled to the lower surface of the impeller 200. The rotor back yoke 411 may be coupled to the impeller 200 where the impeller 200 is formed by insert injection molding. The rotor back yoke 411 is in the form of a disk having an open central portion. The rotor back yoke 411 is made of an iron-based material.

The permanent magnet 412 serves to generate a magnetic field and is fixedly coupled to the lower surface of the rotor back yoke 411. The permanent magnet 412 is in the form of a disk having an open central portion. The permanent magnet 412 has a structure in which its N and S poles are magnetized alternately in the circumferential direction thereof.

The rotor bush 413 allows the impeller 200 to smoothly rotate about the shaft 300. The rotor bush 413 is rotatably assembled to the outside of the shaft 300 while being fixedly coupled to the lower central portion of the impeller 200. The rotor bush 413 may be coupled to the shaft 300 via a bearing. The rotor bush 413 is made of a metal-based material.

In FIGS. 1 and 3, reference numeral 130 denotes an upper O-ring. The upper O-ring 130 is in airtight contact with the lower surface of the pump cover 100 and the upper surface of the casing 440 to prevent fluid from flowing into the gap between the lower surface of the pump cover 100 and the upper surface of the casing 440.

The stator 420 is configured to generate a magnetic field using an externally applied current. The stator 420 rotates the rotor 410 by generating the magnetic field. The stator 420 is disposed with a predetermined gap (see "S" in FIG. 3) formed beneath the rotor 410. The gap S is a clearance space existing between the upper surface of the stator 420 and the lower surface of the rotor 410.

The rotor 410 is rotated by the magnetic field generated in the stator 420. The gap S is provided to prevent mutual interference between the stator 420 and the rotor 410 when the rotor 410 is rotated. The size of the gap S is set to be a minimum distance to prevent friction between the stator 420 and the rotor 410 when the rotor 410 is rotated.

The stator 420 includes a plurality of stator cores 421, a bobbin 423, a coil 424 disposed on the outer peripheral surface of each of the stator cores 421, and a stator back yoke 425 supporting the lower portions of the stator cores 421.

The stator core 421 is magnetized by the magnetic field generated when a current is applied to the coil 424, thereby serving as a magnet. In addition, the stator core 421 serves as a path for the magnetic field generated when a current is applied to the coil 424. The stator core 421 includes a core head 4211 and a core body 4212 formed integrally on the lower surface of the core head 4211.

The core head 4211 has a larger cross-sectional area than the core body 4212. Since the core head 4211 has a relatively large cross-sectional area, it may receive a greater amount of magnetic flux. Although not illustrated in the drawings, the core head 4211 may also have the same cross-sectional area as the core body 4212. The core head 4211 may be made of a soft magnetic composite (SMC) material.

The bobbin 423 is disposed on the outer peripheral surface of the core body 4212 to provide insulation between the stator core 421 and the coil 424. The bobbin 423 has a cylindrical shape and surrounds the core body 4212. Specifically, the bobbin 423 has a cylindrical shape and is provided with a flange to support the coil 424 wound around the outer peripheral surface thereof. For example, the bobbin 423 is made of a resin-based material.

Referring to the embodiment illustrated in FIG. 3, the bobbin 423 is press-fitted and assembled to the outer peripheral surface of the core body 4212. Alternatively, referring to another embodiment illustrated in FIG. 5, a bobbin 423' is formed integrally with a separator 441 of the casing 440.

When the bobbin 423' is formed integrally with the separator 441, the bobbin 423' extends downwards on the lower surface of the separator 441. In this case, the bobbin 423' is also formed integrally with the lower portion of the stator core 421. Specifically, the bobbin 423' is formed integrally on the lower surface of the separator 441, the core head 4211, and the outer peripheral surface of the core body 4212. To this end, the bobbin 423' is formed by injection molding on the outside of the stator core 421 when the separator 441 is formed by injection molding.

The coil 424 serves as a current passage and receives a current from the outside. The coil 424 receives a current from the outside by means of the drive controller 430.

The drive controller 430 is configured to control the driving of the motor 400. The drive controller 430 controls the driving of the motor 400 by adjusting the current applied to the coil 424. The drive controller 430 is disposed beneath the stator 420 in the internal space of the casing 440. The drive controller 430 is fixedly fastened to the casing 440.

The stator back yoke 425 serves as a passage for magnetic flux, and is fixedly coupled to the lower portions of the stator cores 421. The stator back yoke 425 is coupled to the lower portion of the core body 4212. A protrusion, which is press-fitted to the stator back yoke 425, is provided at the lower portion of the core body 4212.

The stator back yoke 425 is fixedly fastened to the casing 440. The stator back yoke 425 supports the lower surfaces of the bobbins 423. The stator back yoke 425 is in the form of a disk having an open central portion. For example, the stator back yoke 425 is made of an electrical steel sheet.

The casing 440 is configured to receive and protect the stator 420. The casing 440 may have a cylindrical shape and may surround the stator 420. The separator 441 is provided at the upper portion of the casing 440, and the lower portion of the casing 440 is coupled to a casing cover 450.

The casing cover 450 is coupled to the lower portion of the casing 440 to seal the lower surface of the casing 440. The casing cover 450 is airtightly coupled to the lower portion of the casing 440 via a lower O-ring 451. The casing cover 450 is provided with a connector configured to apply external power and a control signal to the drive controller 430.

The separator 441 is formed integrally with the upper portion of the casing 440. The separator 441 is configured to isolate an electrical component of the stator 420 from the fluid introduced into the internal space of the pump cover 100. The electrical component includes the coil 424 and the drive controller 430.

The separator 441 is formed integrally with the upper portion of the stator 420 in order to isolate the electrical component of the stator 420 from the fluid. Specifically, the separator 441 is formed integrally with the upper portion of the stator 420 so as to airtightly surround the entire upper portion of the stator 420, without covering the upper surface of the stator 420. The upper surface of the stator 420 corresponds to the upper surface of the stator core 421. In addition, the upper surface of the stator core 421 corresponds to the upper surface 4211a of the core head 4211.

In other words, the separator 441 is formed integrally with the upper portion of the stator core 421. The separator 441 is formed integrally with the upper portion of the stator core 421 to serve as a partition for the internal space of the casing 440 together with the stator core 421. In other words, the separator 441 serves to airtightly separate the internal space of the casing 440 from the internal space of the pump cover 100 together with the core head 4211 of the stator core 421.

To this end, the separator 441 is formed by injection molding on the outside of the core head 4211 when the casing 440 is formed by injection molding. The casing 440 is formed with the stator core 421 inserted into an injection mold. In this case, the separator 441 is formed integrally with the core head 4211 so as to airtightly surround the core head 4211, without covering the upper surface 4211a of the core head 4211.

Referring to FIG. 3, the separator 441 is formed so as to surround the outer peripheral surface of the core head 4211, without covering the upper surface 4211a of the core head 4211. Accordingly, the upper surface 4211a of the core head 4211 comes into direct contact with the fluid introduced into the pump cover 100.

The separator 441 is formed integrally with the upper portions of the stator cores 421 by injection molding while having a plurality of insert holes 441b arranged in the arrangement direction of the stator cores 421.

Each of the insert holes 441b is airtightly closed by the upper portion of an associated one of the stator cores 421. Specifically, the insert hole 441b is airtightly closed by the core head 4211. The insert hole 441b is airtightly closed by the core head 4211 to block the inflow of the fluid. In other words, it should be impossible for the fluid to flow from the internal space of the pump cover 100 through the insert hole 441b to the internal space of the casing 440.

The upper surface 4211a of the core head 4211 comes into direct contact with the fluid through the insert hole 441b of the separator 441. The upper surface 4211a of the core head 4211 is flush with the upper surface 441a of the separator 441. In other words, the upper surface 4211a of the core head 4211 is horizontally disposed without an axial distance from the upper surface 441a of the separator 441.

The separator 441 is formed so as to expose the upper surface 4211a of the stator core 421 to the gap S. The distance is thereby reduced between the lower surface of the rotor 410 and the upper surface of the stator 420 compared to the case in which a conventional separator 44a completely covers and surrounds the upper portion of a stator 42 (see FIG. 6). When this distance is reduced, the output and efficiency of the motor 400 are increased. In addition, since the stator core 421 is in direct contact with the fluid, the efficiency with which heat is dissipated from the stator 420 is increased.

In the stator core 421, the core head 4211 may also be press-fitted into the insert hole 441b of the separator 441. However, when the core head 4211 of the stator core 421 is press-fitted and assembled to the separator 441, there is a possibility that a fluid may flow through the gap between the core head 4211 and the separator 441. Moreover, there is a possibility that the stator core 421 may be decoupled from the separator 441 by the attractive force of the rotor 410. The above issues can be resolved when the separator 441 is formed integrally on the outer surface of the core head 4211.

In addition, the core head 4211 has a stepped part 4211b formed on the edge thereof. The separator 441 is formed to surround the stepped part 4211b as well. In other words, the separator 441 completely surrounds the core head 4211, except for the upper surface 4211a of the core head 4211. The lower surface of the core head 4211 comes into direct contact with the bobbin 423. Since the core head 4211 includes the stepped part 4211b, the coupling force between the core head 4211 and the separator 441 is further increased.

Furthermore, the separator 441 has a shaft coupling part 442 formed at the radially central portion thereof. The shaft 300 is press-fitted to the shaft coupling part 442, or the shaft coupling part 442 is formed integrally on the outer peripheral surface of the shaft 300.

The motor of the electric water pump according to the present disclosure is designed to have an axial distance of 0.9 mm between the rotor and the stator. The electromotive force and efficiency of the motor of the electric water pump were measured. The motor of the conventional electric water pump is designed to have an axial distance of 1.9 mm between the rotor and the stator. The electromotive force and efficiency of the conventional motor were also measured. As a result of the measurements, it can be seen that the electromotive force and efficiency of the motor according to the present disclosure are improved compared to those of the conventional motor.

As is apparent from the above description, the present disclosure provides the following effects.

First, since the separator is formed so as not to cover the upper surface of the stator, the axial thickness of the separator is reduced and the axial distance between the stator and the rotor is reduced. The reduction in this axial distance allows the motor to have increased output and efficiency.

Second, since the upper surface of the stator is in direct contact with the fluid, the efficiency with which heat is dissipated from the stator is increased.

The present disclosure is not limited to the above effects. Other effects of the present disclosure should be clearly understood by those having ordinary skill in the art from the above detailed description and the configuration defined by the appended claims.

The embodiments of the present disclosure have been described in detail. It is noted that the terms and words used in the specification and claims should not be construed as being limited to common or dictionary meanings. In addition, the present disclosure is not limited to the embodiments set forth herein. It should be apparent to those having ordinary skill in the art that various modifications and improvements may be included in the scope of the disclosure without departing from the basic concept thereof as defined in the appended claims.

What is claimed is:

1. An electric water pump comprising:
   a pump cover having an inlet for inflow of a fluid and an outlet for outflow of the fluid; and
   an impeller disposed in an internal space of the pump cover and rotated by a motor to transfer the fluid, introduced through the inlet, to the outlet,
   wherein the motor includes
      a rotor coupled to the impeller to rotate with the impeller,
      a stator disposed beneath the rotor and configured to rotate the rotor by generating a magnetic field using an externally applied current, and
      a casing configured to receive and protect the stator and provided with a separator to isolate an electrical component of the stator from the fluid,
   wherein the separator is formed integrally with an upper portion of the stator so as to surround the upper portion of the stator, without covering an upper surface of the stator,
   wherein the stator includes
      a plurality of stator cores, each having a core head accommodating magnetic flux and a core body formed integrally on a lower surface of the core head, and magnetized by the magnetic field; and
      a plurality of bobbins, each disposed on an outer peripheral surface of the associated core body and having a coil wound therearound, the current being applied to the coil from outside,
   wherein the plurality of bobbins is formed integrally with the separator such that the plurality of bobbins extends downward on a lower surface of the separator,
   wherein the separator is formed integrally with each core head so as to surround each core head, without covering an upper surface of each core head,
   wherein the separator has a plurality of insert holes arranged in an arrangement direction of the stator cores, and
   wherein the upper surface of each core head comes into direct contact with the fluid respectively through each of the plurality of insert holes.

2. The electric water pump according to claim 1, wherein the upper surface of each core head is flush with an upper surface of the separator.

3. The electric water pump according to claim 1, wherein each of the plurality of insert holes is closed, respectively, by each core head to block the inflow of the fluid.

4. The electric water pump according to claim 1, wherein each core head has a stepped part formed on an edge thereof, and wherein the separator is formed to surround each stepped part as well.

5. The electric water pump according to claim 1, wherein each of the plurality of bobbins is press-fitted and assembled to the outer peripheral surface of the associated core body.

6. The electric water pump according to claim 1, wherein a gap is formed between the upper surface of the stator and a lower surface of the rotor to prevent friction between the rotor and the stator when the rotor is rotated.

* * * * *